United States Patent

[11] 3,612,975

| [72] | Inventor | Arthur T. Keefe<br>Little Bookham, England |
|---|---|---|
| [21] | Appl. No. | 847,654 |
| [22] | Filed | Aug. 5, 1969 |
| [45] | Patented | Oct. 12, 1971 |
| [73] | Assignee | Ian Young (Electronic Designs) Limited<br>London, England |
| [32] | Priority | Aug. 7, 1968 |
| [33] | | Great Britain |
| [31] | | 37634/68 |

[54] ELECTRONIC DATA-PROCESSING APPARATUS
10 Claims, 6 Drawing Figs.

[52] U.S. Cl. ......................................... 318/599,
307/234, 307/235, 307/265, 328/58, 328/146,
328/150, 328/151
[51] Int. Cl. ...................................................... G05b 11/28
[50] Field of Search .......................................... 307/234,
235, 265, 266, 267; 328/58, 150, 151, 146; 330/30
D; 318/599

[56] References Cited
UNITED STATES PATENTS

| 2,557,581 | 6/1951 | Triman ........................ | 328/58 X |
| 2,767,311 | 10/1956 | Meyer ......................... | 328/58 |
| 2,824,285 | 2/1958 | Hunt ........................... | 328/146 X |
| 3,076,128 | 1/1963 | Toski et al. .................. | 328/146 X |
| 3,348,216 | 10/1967 | Vinson ........................ | 328/151 X |

Primary Examiner—Donald D. Forrer
Assistant Examiner—R. C. Woodbridge
Attorney—Kemon, Palmer & Estabrook ABSTRACT: In a circuit for converting a signal representing by its amplitude an item of data into a signal representing the item of data by its pulse duration, or vice versa, by comparison of an input signal with a ramp signal, a calibrating signal is applied to the amplitude-to-duration converter and the resulting pulse duration is compared with a calibrating pulse having a duration corresponding, at the required conversion scale, to the amplitude of the calibrating signal; any error signal from the comparator is used to adjust the ramp slope or ramp base line in a sense such as to reduce the error.

ELECTRONIC DATA-PROCESSING APPARATUS

It is frequently necessary in data-processing apparatus to convert a pulse which represents data by its amplitude to one which represents data by its duration, and vice versa. One example of this is where an analogue potential is being converted to a digitally coded signal with high accuracy. The analogue potential can first be converted to a pulse period and the pulse period is then used to gate a train of pulses derived from an accurate clock source, the pulses passed by the gate entering a counter. The reading of the counter at the end of the pulse period represents the input potential.

However, although highly accurate clock sources can be obtained, the accuracy of the method as a whole is limited by other factors. For example, many transducers for providing the analogue (for example, potentiometers) provide an output potential which, although proportional to some physical parameter, also varies in an undesirable manner with the drive potential applied to the transducer. In addition, many systems suffer from zero drift due to the effects of temperature and ageing of the components in the system.

The present invention is concerned with amplitude-duration and duration-amplitude converters of the kind employing a ramp generator and takes account of drive voltage variations and zero drift. In such converters, to generate a pulse duration signal corresponding to he amplitude of an input potential, the input potential is compared with the instantaneous ramp potential and the indication of equality is used to terminate a pulse which began at the beginning of the ramp waveform or at some specified point on the latter. Usually, for duration-amplitude conversion, the ramp waveform commences with the beginning of a data pulse and the ramp amplitude at the end of the data pulse is the required output potential. Apparatus embodying the present invention includes a ramp generator and a voltage comparator for comparing a first voltage input to the comparator with a second voltage input derived from the ramp generator output so as to produce a comparator output pulse having a pulse width dependent upon the amplitude of the first voltage input; additionally the apparatus includes calibrating means which comprise a reference voltage source, means for applying the reference voltage as the first voltage input to the comparator, a clock source, a pulse period comparator connected to receive the pulse signal output of the voltage comparator and to compare it with a pulse derived from the clock source and having a duration corresponding to the known amplitude of the reference voltage, and a ramp-modifying circuit responsive to a difference in the durations of the two signals applied to the pulse period comparator to modify the ramp in a sense such as to reduce the difference. In apparatus for converting signal amplitude to signal duration, it will be arranged that the reference voltage is subject to any undesirable variations to which the input voltage is subject. As an example, the reference voltage may be a voltage level representing the peak voltage to be handled by the circuit. If the output of the pulse period comparator indicates that this peak reference voltage is too low, this output can be used to operate an analogue clamping circuit to decrease the slope of the ramp generator. An alternative or additional reference voltage may be a level which represents zero in the data system. It will be appreciated that it is desirable to represent zero in a pulse duration system by a pulse having a specific duration and not by the absence of a pulse. If the output of the pulse period comparator indicates that the zero-representing voltage is too high or too low, an analogue clamping circuit can be brought into use to adjust the base line of the ramp waveform. Preferably, both these reference voltages are used. It is advantageous for the converter apparatus to include means for automatically applying these reference voltages to the voltage comparator at frequent intervals, either at uniformly spaced points in time or after a predetermined number of data conversions. As an example, the zero and peak reference voltages could be applied to check the calibration after every ten data conversions.

Signal conversion apparatus of the kind with which the present invention is concerned is frequently used with a control loop including a voltage-dependent device. For example, in apparatus for converting signal duration to signal amplitude, the output signal may be fed to a servosystem including a resetting potentiometer. The resetting signal varies with fluctuations of the voltage applied across the potentiometer terminals and the calibrating voltage can then be derived from the same source to compensate for the errors which would otherwise result in the control loop from the voltage fluctuations across the potentiometer.

In order that the invention may be better understood, one example will now be described with reference to the accompanying drawings, in which:

FIG. 2b is a waveform diagram relating to FIG. 2a;

Figure 1:
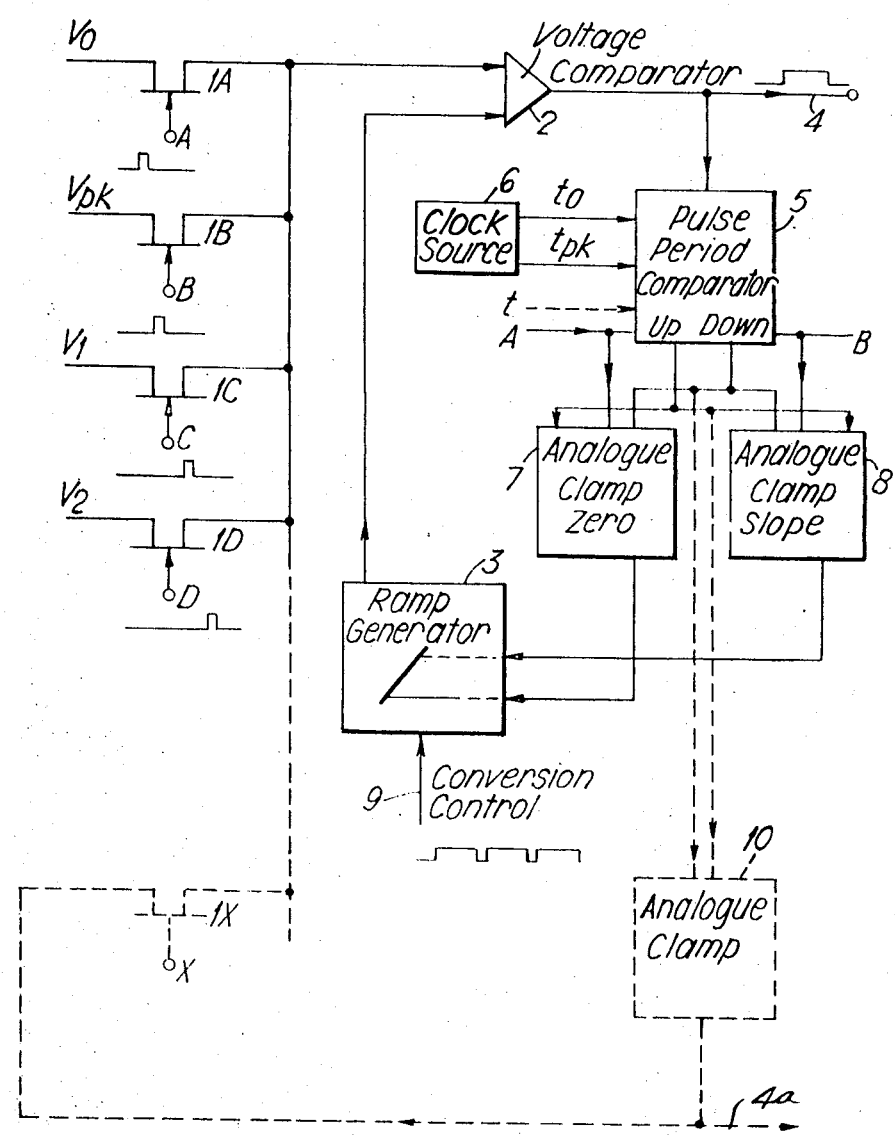
FIG. 1 illustrates, in the form of a block diagram, apparatus embodying the present invention.

In FIG. 1, field effect transistors 1A, 1B, 1C and 1D are used to switch the zero reference potential $V_o$, the peak reference potential $V_{pk}$ (both calibrating voltages) and the data input voltages $V_1$ and $V_2$ in turn to a first input of voltage comparator 2, which is a differential amplifier of high gain. The waveform from a linear voltage ramp generator 3 is fed to the second input of the differential amplifier. When he voltage of the ramp generator 3 slightly exceeds that at the first input of the differential amplifier, the output of the amplifier switches. The period between the beginning of the ramp waveform and the moment of switching then represents the input potential. When the data-representing signals $V_1$ and $V_2$ are applied to the voltage comparator 2, the pulse at the output of the voltage comparator represents the desired duration signal and is fed out along output conductor 4. When the reference voltages $V_o$ and $V_{pk}$ are applied to the voltage comparator, the output of the latter goes to the pulse period comparator 5, in which this pulse output is compared for duration with the duration of a standard signal $t_o$ or $t_{pk}$ derived from the highly accurate clock source 6. The clock source is a crystal-controlled oscillator of known kind and the signals $t_o$ and $t_{pk}$ are derived from it by digital division using counters. The standard signal $t_o$ has a duration corresponding to the known amplitude of the reference voltage $V_o$ when it is not subject to the variations to which the data input signals are also subject. Similarly, the standard signal $t_{pk}$ has a duration corresponding to the known amplitude of the reference $V_{pk}$ when it is not subject to these variations. The output of the pulse period comparator 5 is a signal having a duration corresponding to the difference in the durations of the two input signals, for example when the reference voltage is $V_o$ the different in the durations of the input signal $t_o$ and the pulse (corresponding to $V_o$) from the voltage comparator. This difference output from the pulse period comparator is applied to the analogue clamp "zero" circuit 7 and to the analogue clamp "slope" circuit 8. If a zero voltage has been applied to the voltage comparator 2, an enabling signal A is applied to the analogue clamp "zero" circuit 7 and this circuit is then effective to adjust the base line of the waveform produced by the ramp generator 3 up or down according to whether the duration of the output pulse from the voltage comparator is too short or too long. If the reference voltage applied to the voltage comparator 2 is the peak voltage $V_{pk}$, the analogue clamp "slope" circuit 8 is enabled by a signal over conductor B and this circuit is then effective to adjust the slope of the waveform produced by the ramp generator to increase or decrease the slope depending upon the sense of the duration error.

It is convenient to make all pulses from the comparator 2, including the reference pulses, available on the output conductor 4. If the reference pulses are not required they can be gated out at a later stage.

The ramp generator is triggered by a signal on the conversion control line 9. The intervals between e triggering signals are such as to permit the ramp voltage to return to its starting position and to allow analogue signals which are switched to settle.

Figure 2A:
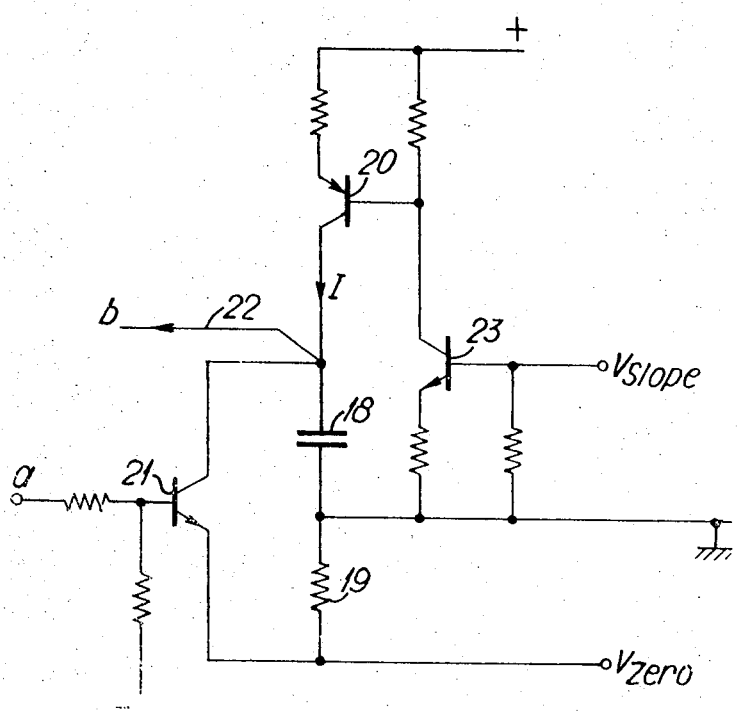
FIG. 2a shows the circuit of the ramp generator of FIG. 1
Figure 2B:
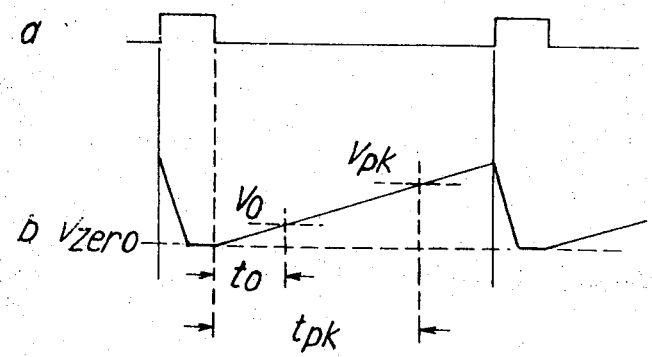

FIG. 2 shows a ramp generator and the zero-adjusting and slope-adjusting connections. A capacitor 18 is charged by a current I flowing through a transistor 20 and is periodically discharged by means of a transistor 21, the base of which receives a periodic drive signal a (FIG. 2b) to render it conducting. It will be seen that the transistor 21 is connected across the series combination of the capacitor 18 and a resistor 19. The zero-adjusting terminal is connected to the junction of the emitter of the transistor 21 and the resistor 19. Thus, the voltage on an output conductor 22 at the start of the ramp is controlled by a negative voltage (representing zero level) applied to the base of the resistor 19 and consequently this zero-level voltage controls the time at which the ramp potential passes through a level $V_o$. In the absence of undersired voltage fluctuations this should occur at time $t_o$.

The slope-adjusting voltage is applied to the base of a transistor 23. The junction of the collector of this transistor and its collector load is connected to the base of the charging transistor 20. Thus, the slope-adjusting voltage applied to the base of transistor 23 sets the level of the current I that is linearly integrated by the capacitor and thus adjusts the slope of the amp voltage on the output conductor. The ramp waveform is shown at b in FIG. 2b.

Figure 3:
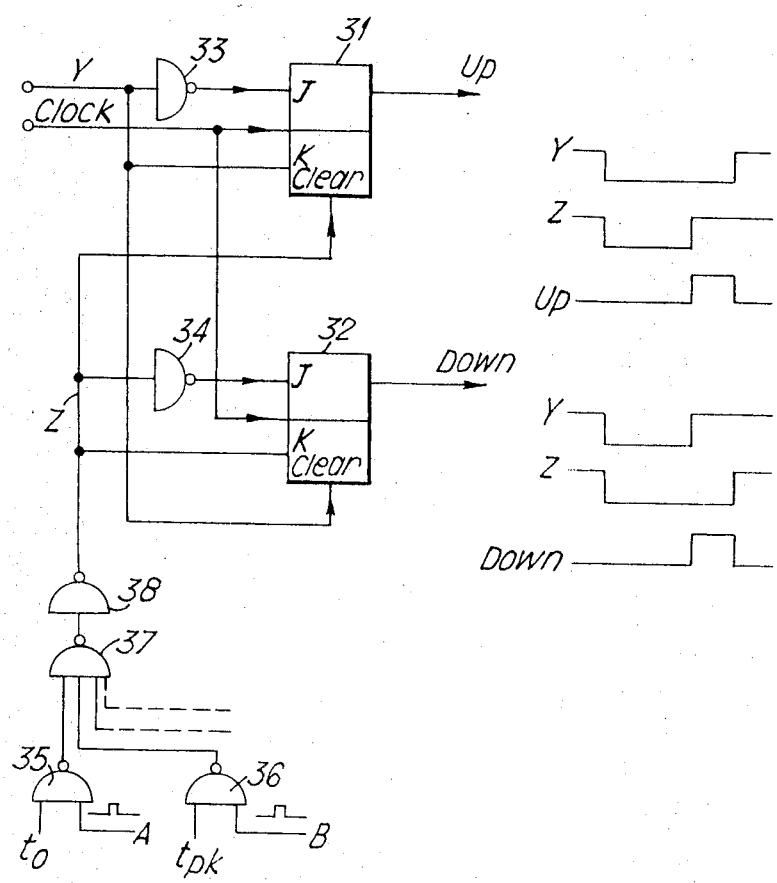
FIG. 3a shows in greater detail the pulse duration comparator of FIG. 1.

As shown in FIG. 3, the pulse duration comparator employs two bistable circuits 31 and 32. Input Y, which is the input from the voltage comparator, is connected directly to the K input of the first bistable circuit 31 and through an inverter 33 to the J input of this circuit. It is also connected directly to the "clear" input of the second bistable circuit 32. Similarly, input Z is connected directly to the K input of bistable circuit 32, through an inverter 34 to the J input of this circuit, and directly to the "clear" input of bistable circuit 31. Considering the latter bistable circuit, it is held by input Z, which is the reference input $t_o$ or $t_{pk}$ on the clear input until the end of pulse Z. If pulse Z is shorter than pulse Y, then the state of the J and K inputs on bistable circuit 31 allows the high speed clock to change the state of the bistable following the cessation of pulse Z. At the end of pulse Y, the phase of the J and K inputs is reversed and the clock returns the output to its original state. Should pulse Z be longer than pulse Y, the bistable circuit remains clamped in the original state for the whole of the period in which pulse Y could have allowed the clock to operate and consequently there is no output from bistable circuit 31. The situation is reversed for bistable circuit 32, so that this circuit produces an output pulse only when pulse Z is longer than pulse Y. In each case, the duration of the output pulse is approximately that of the difference in duration of the inputs but is effectively resolved by the clock frequency.

The signal to be applied to input Z is selected by means of gating circuits. Input $t_o$ is applied to a gate 35 performing an "AND" function and passes through this gate when the gate also receives the gating waveform A. Input $t_{pk}$ is applied to a similar gate 36. The outputs of these gates and any further gates for applying signals to the input Z are applied to a combination of two NOR gates 37 and 38 which together function as an OR gate to apply any of the signals passed by gates 35, 36, etc. to the input line Z.

A pulse from bistable circuit 31 indicates that an "up" correction is required; this means that in the case of a reference voltage $V_o$ and a reference period $t_o$ the base line of the ramp must be raised, and in the case of the reference voltage $V_{pk}$ and reference period $t_{pk}$ the slope of the ramp must be increased. An output pulse from the bistable circuit 32 indicates a "down" correction; this means that in the case of the reference voltage $V_o$ and reference period $t_o$ the base line of the ramp must be lowered and in the case of the reference voltage $V_{pk}$ and reference period $t_{pk}$, the slope of the ramp must be reduced. As shown in FIG. 1, separate analogue clamping circuits are provided for the base line and slope adjustments and they are selectively rendered effective in accordance with the reference voltage which is being applied to the voltage comparator.

Figure 4:
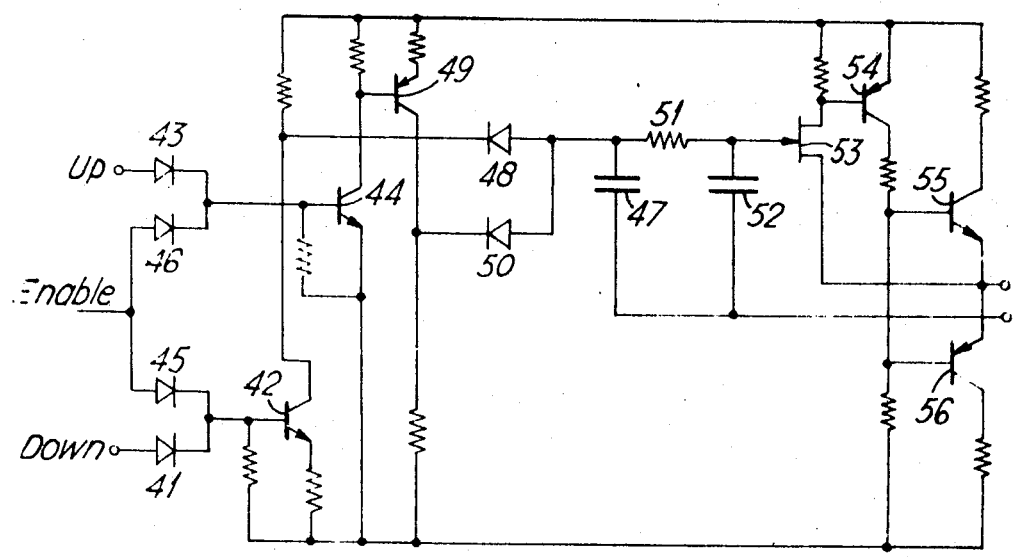
FIG. 4 shows in greater detail the analogue clamping circuits of FIG. 1.

One of these analogue clamping circuits is shown in FIG. 4. As shown in FIG. 4, the "down" pulse is applied through a diode 41 to the base of a transistor 42 and an "up" pulse is applied through a diode 43 to the base of a transistor 44. However, these pulses are only effective when an enabling signal is applied through diodes 45 and 46 respectively to the transistors 42 and 44. When the enabling signal is present, a "down" pulse causes transistor 42 to extract current from a capacitor 47 through a diode 48 with a very low leakage. Similarly, in the presence of an enabling signal, an "up" pulse acts through transistor 44 to cause transistor 49 to supply current to capacitor 47 by way of diode 50, which is of the same type as diode 48. Resistor 51 and capacitor 52 act as a filter to these excursions. The potential on capacitor 52 is fed to the output amplifier. This includes a junction field effect transistor 53 which requires less than $10^{19}$ amps gate current, drawn from 52. The source connection of this field effect transistor is connected to the amplifier output. Its drain connection extends to the base of a transistor 54, the collector circuit of which feeds the bases of balanced transistors 55 and 56 of opposite conductivity types, their junction being connected to the output of the amplifier. The effective cathode follower action provides a very low output impedance from the amplifier, which has unity voltage gain but a very high current gain.

In FIG. 4, the capacitors 47 and 52 may have a value between $0.1 \mu f$. and $2 \mu f$. depending on the application. Transistor 53 may be of the type MPF104, made by Motorola; transistors 42, 44 and 55 may be of the type BFY51, made by Mullard; and transistors 49, 54 and 56 may be of the type BFY64 made by Fairchild. Diodes 48 and 50 may be of the type EC402 (Fairchild) and diodes 41, 43, 45 and 46 of the type IN914, made by various manufactures. Resistor 51 may have a value of 10 kilohms. The circuit shown in FIG. 4 is used both for the zero analogue clamp and for the slope analogue clamp.

Figure 5:
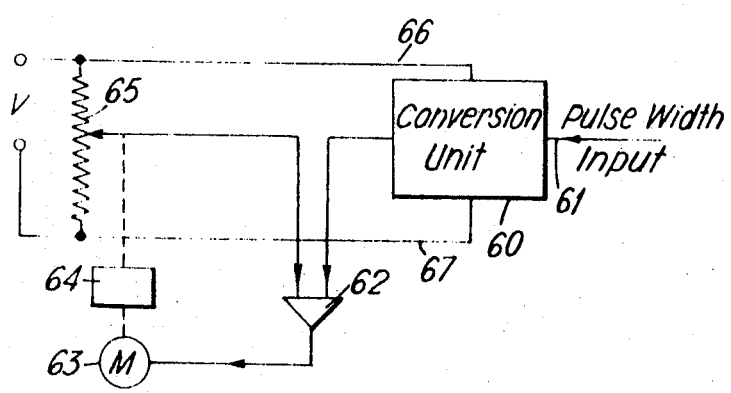
FIG. 5 shows a servosystem incorporating conversion apparatus of the kind described with reference to FIGS. 1 to 4.

The apparatus shown diagrammatically in FIG. 1 can be used to convert pulse durations into proportional voltages in cases where ramp calibration is still required to avoid the effect of undesired voltage changes. One example of such apparatus is shown in FIG. 5, in which the conversion unit constituted by FIG. 1 is shown by the box 60. An input signal having a pulse width (i.e. duration) representing an item of data is fed into the conversion unit 60 on line 61 and an analogue output signal is fed from the unit 60 to a servo amplifier 62. The servo system is a conventional one in which the amplifier output feeds a motor 63 which, through a gearbox 64, drives the wiper of a resetting potentiometer 65, this wiper providing the balancing signal for the servoamplifier. Any fluctuations in the voltage V which is applied across the potentiometer would affect the position taken up by the servomotor. To avoid this, the same voltage V is applied along lines 66 and 67 to the conversion unit 60, where it acts as a calibrating voltage.

The apparatus of FIG. 1 is used for duration-to-amplitude conversion in the following manner. An input signal $t$ having a duration representing an item of data is gated into the pulse period comparator 5 where it is compared with a pulse received from the voltage comparator 2 as a consequence of the application to the latter of a voltage received from the output of an analogue clamping circuit 12 through a field effect transistor 1X, enabling signals X being applied to the field effect transistor and to the clamping circuit 12 for this purpose. The pulse period provided by the comparator 2 corresponds at a scale determined by he ramp with the amplitude of the signal from the analogue clamp 10. Any difference between this pulse period and the input pulse period $t$ causes the potential provided by the analogue clamp 10 to be adjusted up or down in a sense such as to eliminate the difference in the pulse period. When this is achieved, the potential provided by the analogue clamp 10 corresponds to the duration of the input pulse $t$ and this potential is applied to the output line 4a. The clamping circuit 12 is of the form shown in FIG. 4. The calibrating voltage which takes the place of $V_{pk}$ is now derived from the source which supplies the potentiometer of FIG. 5 and, as before, it is compared with a pulse of known width, derived from the clock source, and the error is used to adjust the ramp.

In some cases, the initial demand signal is generated by a computer in digital form. This can be converted to analogue form by initially generating a pulse width signal by measuring the time that the clock oscillator takes to count up to the digital value obtained from the computer, after which the pulse width signal is used as the signal $t$ for the conversion apparatus of FIG. 1.

In most cases of electrical measurement, the signal resulting from the measurement is a fraction of some other voltage, for example the voltage at the wiper of a potentiometer is a fraction of that across the potentiometer as a whole. In such cases the calibrating technique described in this specification avoids errors due to fluctuations in the originating signal. In some special cases, notably thermocouples, the signal is intrinsic and is not related to anything else. In this case the technique described in this specification is still useful but the calibrating voltage has to be as stable a standard voltage as is possible, since there is no fixed relationship to the signal being measured. The output is then available in absolute terms of pulse width or voltage instead of the relative one which is obtained if the voltage used is not accurate, although related to the other inputs.

I claim:

1. Apparatus for converting a signal representing by its amplitude an item of data into a signal representing the item of data by its pulse duration, or vice versa, by comparison of an input signal with a ramp signal, including a ramp generator, a voltage comparator for comparing a first voltage input to the comparator with a second voltage input derived from the ramp generator output so as to produce a comparator output signal having a pulse width dependent upon the amplitude of the first voltage input to the comparator, and calibrating means, said calibrating means comprising:

means for obtaining a calibrating voltage and applying this calibrating voltage as a first voltage input to said voltage comparator;

a clock source;

means for deriving a calibrating pulse of known period from said clock source, the known period corresponding, at the required ramp slope, to the amplitude of said calibrating voltage;

a pulse period comparator connected to receive said pulse of known period and the pulse output of said voltage comparator, derived from said calibrating voltage, and providing a signal representing the difference in the durations of the two pulse periods;

and a ramp-modifying circuit responsive to the pulse period difference signal from said pulse period comparator to modify the ramp in a sense such as to reduce the difference.

2. Apparatus in accordance with claim 1, for converting a signal representing by its amplitude an item of data into a signal representing the item of data by its pulse duration, the signal representing data by its amplitude being subject to amplitude fluctuations unrelated to the data represented by that signal, in which the calibrating voltage is subject to the same amplitude fluctuations as the said input signal, the period of the pulse derived from the clock source remaining unchanged.

3. Apparatus in accordance with claim 1, for converting a signal representing by its duration an item of data into a signal representing the item of data by its amplitude, in which said pulse period comparator is connected to receive firstly the signal representing by its duration an item of data and secondly the pulse output of said voltage comparator and in which the output of said pulse period comparator, and thereby the first voltage input of said voltage comparator, is adjusted until the pulse periods are equal, said first voltage input of said voltage comparator constituting the output signal representing the item of data by its amplitude, the apparatus further comprising a null servosystem connected to receive the said output signal as a control signal and effecting an operation to an extent dependent on the amplitude of said control signal, said null servosystem including for producing a balancing signal a device such that the balancing signal is subject to fluctuations in a supply voltage, and wherein the calibrating voltage is subject to the same fluctuations and the period of the calibrating pulse derived from said clock source remains unchanged.

4. Apparatus in accordance with claim 1, for use with alternative calibrating voltages having levels representing respectively a peak input voltage to be handled by the circuit and a zero data level, the apparatus being such that a zero data level input signal produces a pulse of finite output width, the ramp modifying circuit including firstly means for adjusting the slope of the output of the ramp generator in accordance with the difference in the durations of the two signals applied to the pulse period comparator, when the calibrating voltage has a level representing the peak input voltage, and secondly alternative means for adjusting the base line of the ramp waveform in accordance with the difference in the durations of the two signals applied to the pulse period comparator, when the calibrating voltage represents the zero data level.

5. Apparatus in accordance with claim 3, in which the said device for generating a balancing signal is a potentiometer, the wiper of which is adjusted by the null servo system and supplies the balancing signal for the latter.

6. Apparatus in accordance with claim 1, in which the calibrating voltage is obtained from a standard voltage source.

7. Apparatus in accordance with claim 1, for use when the calibrating voltage has a level representing a input voltage to be handled by the circuit, the ramp modifying circuit comprising means for adjusting the slope of the output of the ramp generator in accordance with the difference in the durations of the two signals applied to he pulse period comparator.

8. Apparatus in accordance with claim 7, in which the ramp-modifying circuit includes a capacitor arranged for alternate charging and discharging with a current-modifying element in the charging circuit controlled in accordance with the said difference in the durations of the signals applied to the pulse period comparator.

9. Apparatus in accordance with claim 1, for use with a calibrating voltage representing a zero data level, the apparatus being such that a zero level input signal produces a pulse of finite output width, the ramp-modifying circuit including means for adjusting the base line of the ramp waveform in accordance with the difference in the durations of the two signals applied to the pulse period comparator.

10. Apparatus in accordance with claim 9, in which the ramp-modifying circuit includes a capacitor arranged for alternate charging and discharging and means controlling the potential across the capacitor when discharged in accordance with the difference in the durations of the two signals applied to the pulse period comparator.